United States Patent
Huxol et al.

(10) Patent No.: US 10,252,380 B2
(45) Date of Patent: Apr. 9, 2019

(54) REPAIR OR REMANUFACTURE OF BLADE PLATFORM FOR A GAS TURBINE ENGINE

(71) Applicant: Mechanical Dynamics & Analysis LLC, Latham, NY (US)

(72) Inventors: Jason Huxol, Hondo, TX (US); Jayson Houston, San Antonio, TX (US); Mark Towner, Kenedy, TX (US); Leissner Ferdinand Poth, III, San Antonio, TX (US)

(73) Assignee: Mechanical Dynamics & Analysis LLC, Latham, NY (US)

( * ) Notice: Subject to any disclaimer, the term of this patent is extended or adjusted under 35 U.S.C. 154(b) by 888 days.

(21) Appl. No.: 14/482,273

(22) Filed: Sep. 10, 2014

(65) Prior Publication Data

US 2016/0067836 A1    Mar. 10, 2016

(51) Int. Cl.
| | |
|---|---|
| B23P 6/00 | (2006.01) |
| B23P 6/04 | (2006.01) |
| B23H 9/10 | (2006.01) |
| F01D 5/00 | (2006.01) |
| B23H 1/04 | (2006.01) |
| B23H 1/00 | (2006.01) |

(52) U.S. Cl.
CPC ............... B23P 6/005 (2013.01); B23H 9/10 (2013.01); B23P 6/045 (2013.01); F01D 5/005 (2013.01); B23H 1/00 (2013.01); B23H 1/04 (2013.01); F05D 2230/12 (2013.01); F05D 2230/237 (2013.01); F05D 2240/80 (2013.01)

(58) Field of Classification Search
CPC ........... B23P 6/002; B23P 6/005; B23P 6/045; F01D 5/005; F05D 2230/12; F05D 2230/80; Y10T 29/49318; Y10T 29/49732; Y10T 29/49734; Y10T 29/49737; Y10T 29/49742; B23H 1/00; B23H 1/04; B23H 9/10; B23H 9/12
See application file for complete search history.

(56) References Cited

U.S. PATENT DOCUMENTS

| | | |
|---|---|---|
| 5,134,774 A | 8/1992 | Porter |
| 5,261,480 A | 11/1993 | Wortmann et al. |
| 5,895,205 A | 4/1999 | Werner et al. |
| 6,199,746 B1 | 3/2001 | Dupree et al. |
| 6,508,000 B2 | 1/2003 | Burke et al. |
| 6,908,288 B2 | 6/2005 | Jackson et al. |
| 7,449,658 B2 | 11/2008 | Mielke |
| 7,648,341 B2 | 1/2010 | Lau |
| 8,640,942 B1 * | 2/2014 | Ozbaysal ........... B23K 35/3033 228/119 |
| 2003/0034379 A1 | 2/2003 | Jackson et al. |
| 2008/0267775 A1 | 10/2008 | Grady et al. |

(Continued)

FOREIGN PATENT DOCUMENTS

| | | |
|---|---|---|
| EP | 1940581 A1 | 7/2008 |
| EP | 2317075 A2 | 5/2011 |

(Continued)

*Primary Examiner* — Matthew P Travers
(74) *Attorney, Agent, or Firm* — Burris Law, PLLC

(57) ABSTRACT

A method of remanufacturing a turbine component includes electrical discharge machining a puck via the turbine component to form an electrical discharged machined puck; and brazing the electrical discharged machined puck to the turbine component.

23 Claims, 8 Drawing Sheets

(56) References Cited

U.S. PATENT DOCUMENTS

| | | |
|---|---|---|
| 2009/0060714 A1 | 3/2009 | Moors |
| 2009/0255117 A1* | 10/2009 | Hovel ............... B23K 1/0018 |
| | | 29/889.1 |
| 2015/0165569 A1* | 6/2015 | Georgieva ............ B23P 6/045 |
| | | 228/119 |
| 2015/0367456 A1* | 12/2015 | Ozbaysal ............ B23K 35/025 |
| | | 419/8 |

FOREIGN PATENT DOCUMENTS

| | | |
|---|---|---|
| EP | 2361720 A1 | 8/2011 |
| GB | 2095589 A | 10/1982 |

\* cited by examiner

REPAIR OR REMANUFACTURE OF BLADE PLATFORM FOR A GAS TURBINE ENGINE

BACKGROUND

The present disclosure relates to a gas turbine engine and, more particularly, to a repair or remanufacture procedure for a component thereof.

Gas turbine engines generally include a gas generator with a compressor section to pressurize an airflow, a combustor section to burn a hydrocarbon fuel in the presence of the pressurized air, and a turbine section to extract energy from the resultant combustion gases. In an industrial gas turbine (IGT) engine, a core gas stream generated in the gas generator is passed through a power turbine section to produce mechanical work.

The core gas stream downstream of combustor section may subject the turbine components to pressure gradients, temperature gradients, and vibrations that may result in thermal-mechanical fatigue cracks. Eventually, the turbine components may need to be replaced multiple times over the engine service life. Replacement of such components is relatively expensive such that there are often considerable economic incentives to repair these components.

SUMMARY

A method of remanufacturing a turbine component according to one disclosed non-limiting embodiment of the present disclosure includes electrical discharge machining a puck via the turbine component to form an electrical discharged machined puck; and brazing the electrical discharged machined puck to the turbine component.

A further embodiment of the present disclosure includes electrical discharge machining the puck via an underplatform of the turbine component.

A further embodiment of any of the foregoing embodiments of the present disclosure includes, wherein the turbine component is a turbine blade.

A further embodiment of any of the foregoing embodiments of the present disclosure includes, wherein electrical discharge machining the puck via the turbine component results in an interface gap between the electrical discharged machined puck and the turbine component of less than about 0.005" (0.127 mm).

A further embodiment of any of the foregoing embodiments of the present disclosure includes manufacturing the puck from a braze presintered preform (PSP) prior to the electrical discharge machining.

A further embodiment of any of the foregoing embodiments of the present disclosure includes casting the puck prior to the electrical discharge machining.

A further embodiment of any of the foregoing embodiments of the present disclosure includes machining the puck prior to the electrical discharge machining.

A further embodiment of any of the foregoing embodiments of the present disclosure includes tack welding the electrical discharged machined puck to the turbine component prior to the brazing.

A method of remanufacturing a platform of a turbine blade, according to another disclosed non-limiting embodiment of the present disclosure electrical discharge machining a puck via an underplatform of the platform to form an electrical discharged machined puck; and brazing the electrical discharged machined puck to the underplatform to increase the thickness of the platform.

A further embodiment of any of the foregoing embodiments of the present disclosure includes, wherein electrical discharge machining the puck results in an interface gap between the electrical discharged machined puck and the underplatfrom of less than about 0.005" (0.127 mm).

A further embodiment of any of the foregoing embodiments of the present disclosure includes manufacturing the puck from a braze presintered preform (PSP) prior to the electrical discharge machining.

A further embodiment of any of the foregoing embodiments of the present disclosure includes tack welding the electrical discharged machined puck to the turbine component prior to the brazing.

A turbine blade with a platform for a gas turbine engine according to another disclosed non-limiting embodiment of the present disclosure includes an underplatform of the platform; and an electrical discharged machined puck brazed to the underplatform, an interface gap between the electrical discharged machined puck and the underplatfrom less than about 0.005" (0.127 mm).

A further embodiment of any of the foregoing embodiments of the present disclosure includes, wherein the interface gap is about 0.0005"-0.0045" (0.0127-0.1143 mm).

A further embodiment of any of the foregoing embodiments of the present disclosure includes, wherein the electrical discharged machined puck is semi-circular.

A further embodiment of any of the foregoing embodiments of the present disclosure includes, wherein the underplatform is a suction side of the platform.

A further embodiment of any of the foregoing embodiments of the present disclosure includes, wherein the electrical discharged machined puck includes a multiple of features.

A further embodiment of any of the foregoing embodiments of the present disclosure includes, wherein the electrical discharged machined puck includes a multiple of chevron-shaped turbulators opposite the underplatform.

A further embodiment of any of the foregoing embodiments of the present disclosure includes, wherein the electrical discharged machined puck includes a multiple of ribs opposite the underplatform.

A further embodiment of any of the foregoing embodiments of the present disclosure includes, wherein the electrical discharged machined puck has a thickness of about 0.030"-0.375" (0.762-9.525 mm).

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
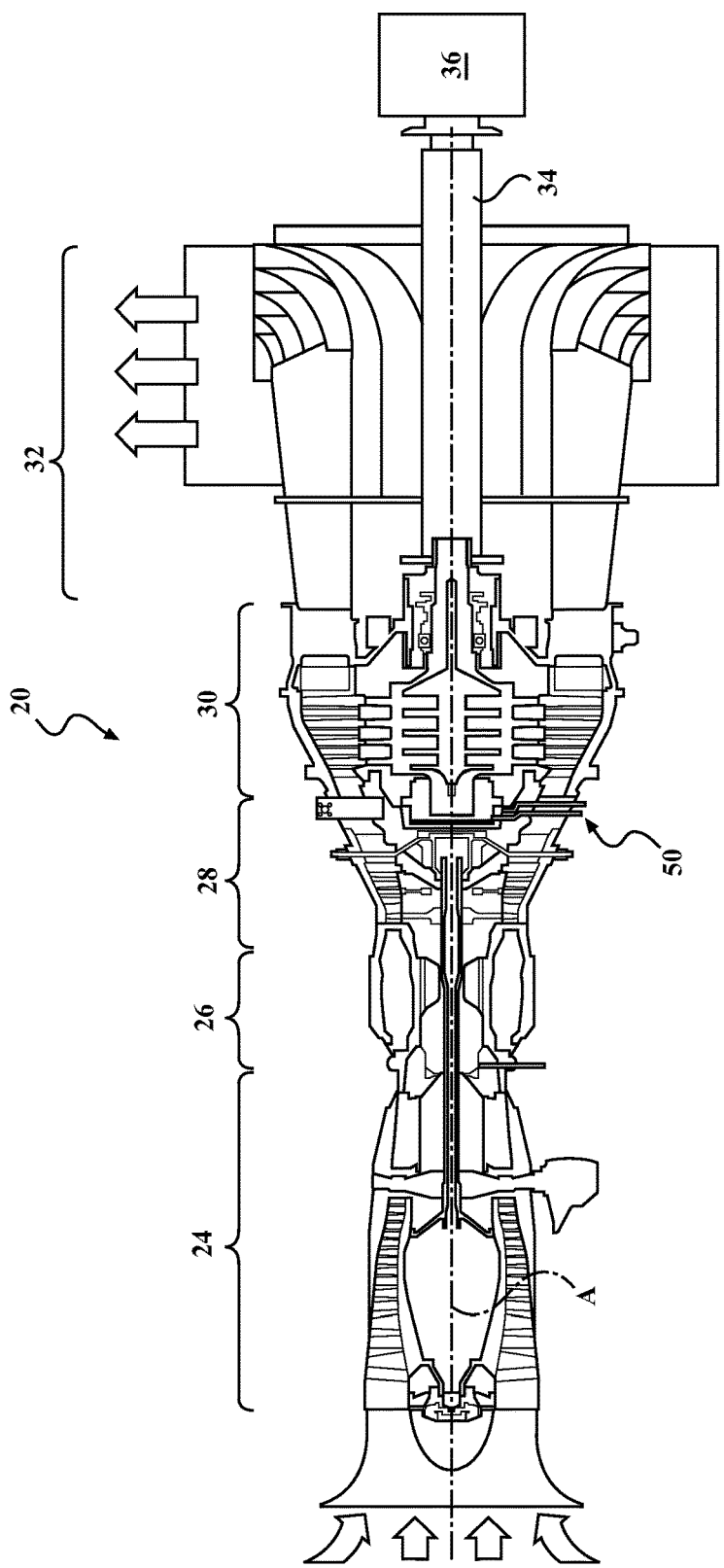
FIG. 1 is a schematic cross-section of one example gas turbine engine.
Figure 2:
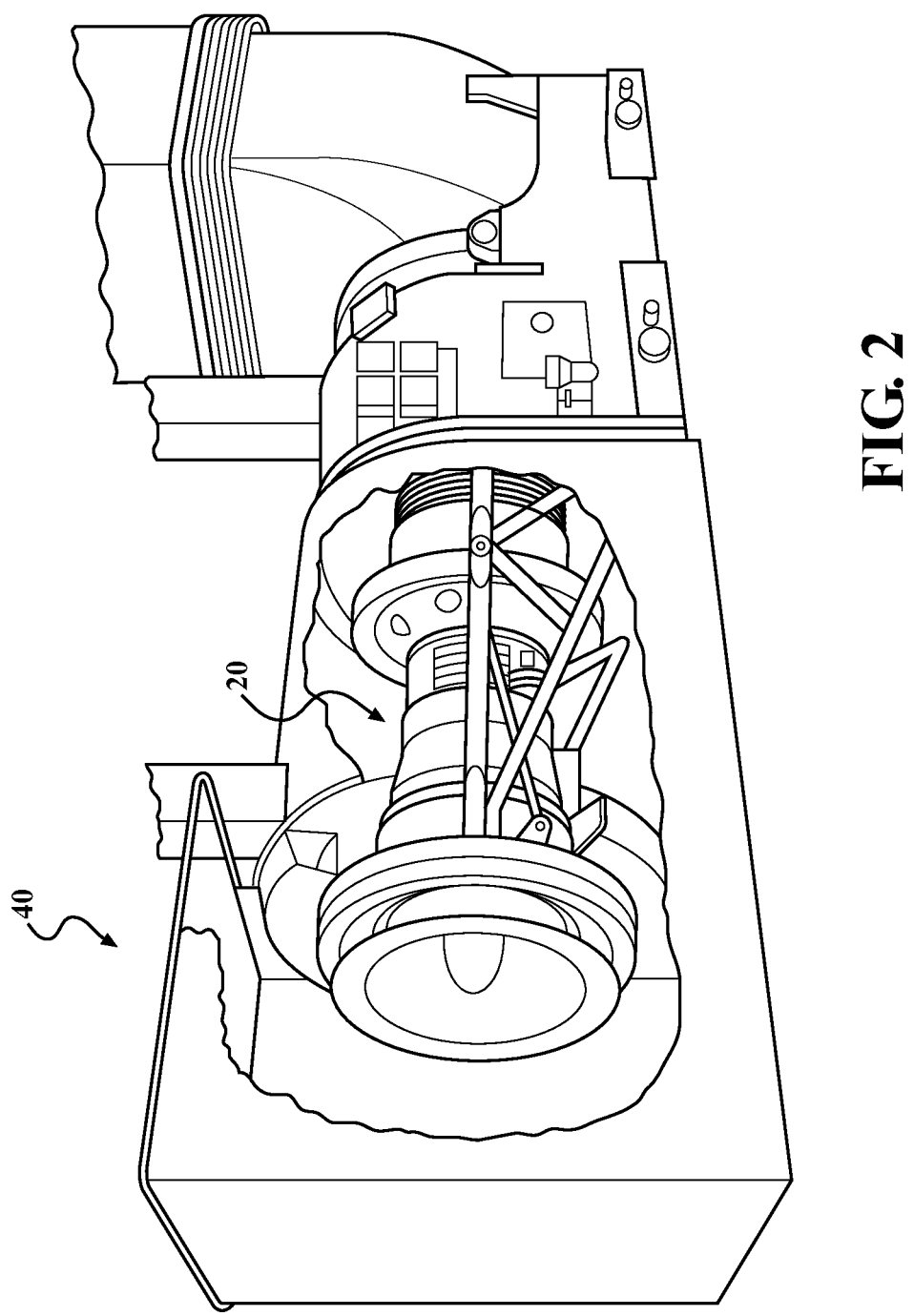
FIG. 2 is a schematic view of an example gas turbine engine in an industrial gas turbine environment.

FIG. 1 schematically illustrates a gas turbine engine 20. The gas turbine engine 20 generally includes a compressor section 24, a combustor section 26, a turbine section 28, a power turbine section 30, and an exhaust section 32. The engine 20 may be installed within a ground-mounted enclosure 40 (FIG. 2) typical of an industrial gas turbine (IGT). Although depicted as specific engine architecture in the disclosed non-limiting embodiment, it should be understood that the concepts described herein are not limited to only such architecture as the teachings may be applied to other gas turbine architectures.

The compressor section 24, the combustor section 26, and the turbine section 28 are collectively referred to as a gas generator that is operable to drive the power turbine section 30. The power turbine section 30 drives an output shaft 34 to power a generator 36 or other system. In one disclosed non-limiting embodiment, the power turbine section 30 includes a free turbine with no physical connection between the gas generator and the power turbine section 30. The generated power is a thereby a result of mass flow capture by the otherwise free power turbine.

Figure 3:
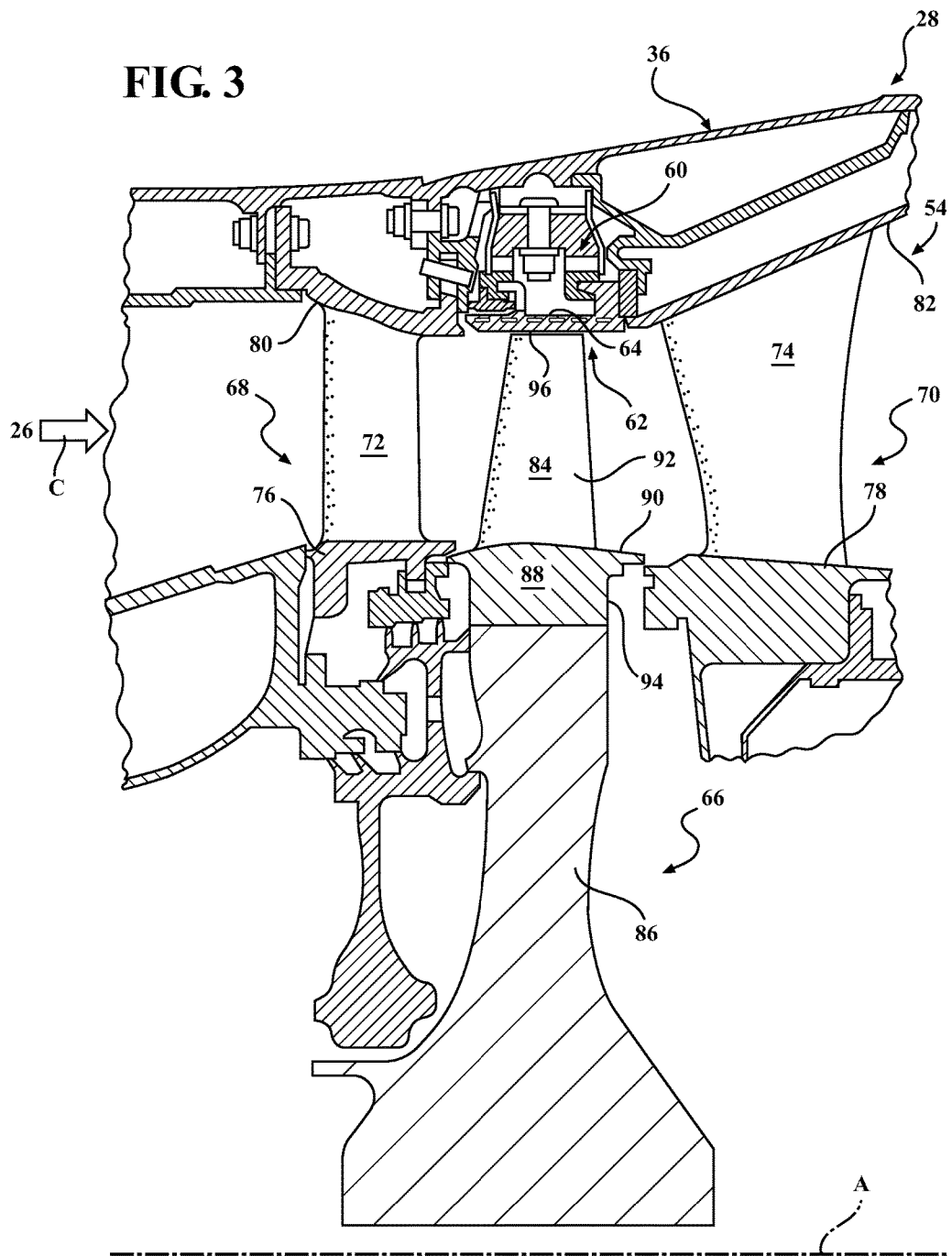
FIG. 3 is an enlarged schematic cross-section of a turbine section of the engine.

With reference to FIG. 3, an enlarged schematic view of a portion of the turbine section 28 is shown by way of example; however, other engine sections will also benefit herefrom. A full ring shroud assembly 60 mounted to an engine case structure 36 supports a Blade Outer Air Seal (BOAS) assembly 62 with a multiple of circumferentially distributed BOAS 64 proximate to a rotor assembly 66 (one schematically shown). The full ring shroud assembly 60 and the BOAS assembly 62 are axially disposed between a forward stationary vane ring 68 and an aft stationary vane ring 70. Each vane ring 68, 70 includes an array of vanes 72, 74 that extend between a respective inner vane platform 76, 78, and an outer vane platform 80, 82. The outer vane platforms 80, 82 are attached to the engine case structure 36.

Figure 4:
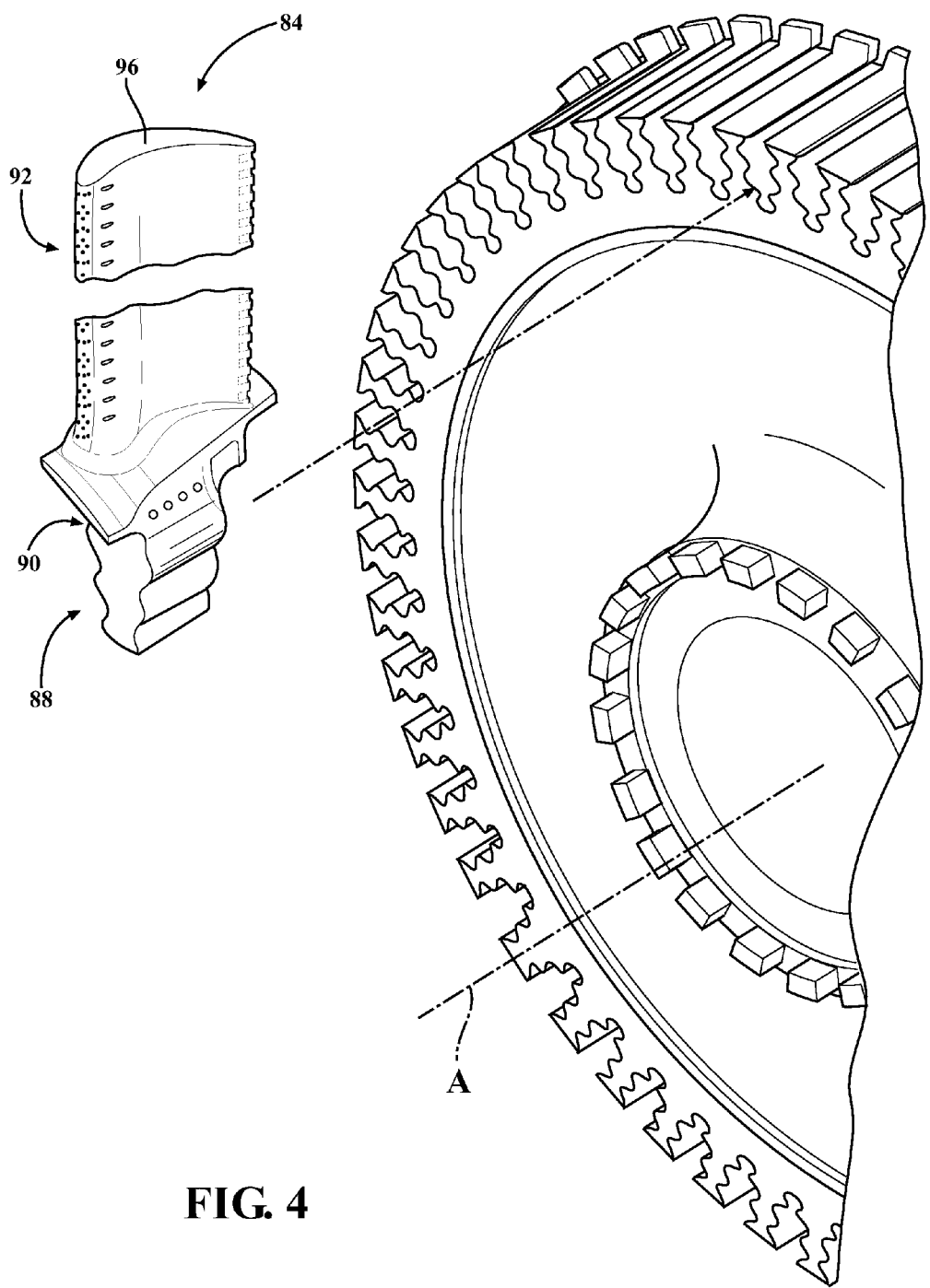
FIG. 4 is an enlarged perspective view of a turbine rotor and single representative rotor blade of the engine.

The rotor assembly 66 includes an array of blades 84 (one shown in FIG. 4) circumferentially disposed around a disk 86. Each blade 84 includes a root 88, a platform 90, and an airfoil 92. Each blade root 88 is received within a rim 94 of the disk 86 such that the airfoils 92 extend radially outward so that a tip 96 of each airfoil 92 is adjacent the BOAS assembly 62. The blades 84 are typically manufactured of, for example, a Nickel Alloy.

Combustion gases produced in the combustor section 26 (indicated schematically by arrow C) expand in the turbine section 28 and produce pressure gradients, temperature gradients, and vibrations. The turbine components in the turbine section 28 are thereby subject to thermal-mechanical fatigue that, over time, may generate cracks in these components.

Figure 5:
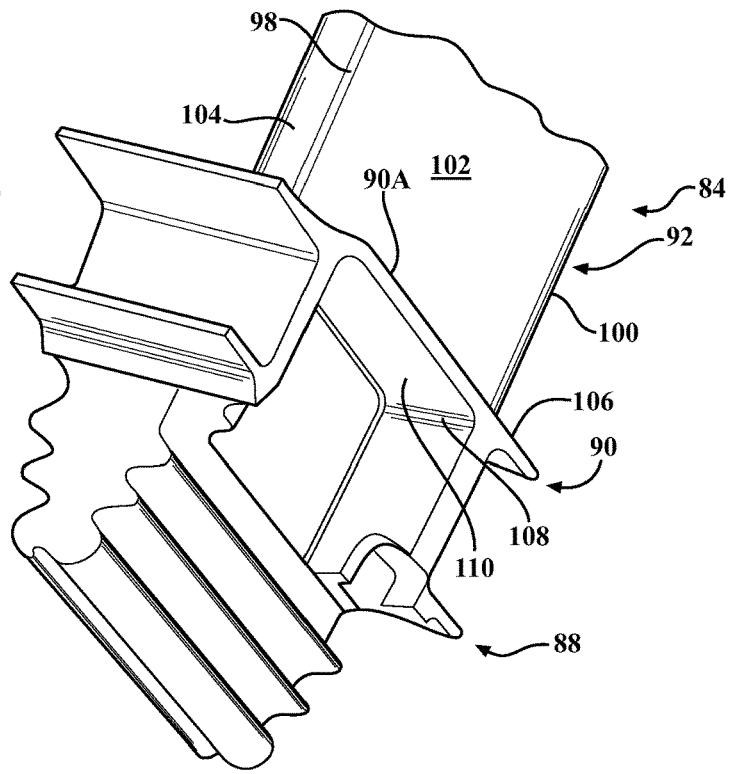
FIG. 5 is an expanded view of an underplatform region of the rotor blade.

With reference to FIG. 5, the platform 90 generally separates the root 88 and the airfoil 92 to define an inner boundary of the core gas path. The airfoil 92 defines a blade chord between a leading edge 98, which may include various forward and/or aft sweep configurations, and a trailing edge 100. A first airfoil sidewall 102 that may be convex to define a suction side, and a second airfoil sidewall 104 that may be concave to define a pressure side are joined at the leading edge 98 and at the axially spaced trailing edge 100. The platform 90 includes a gas path side 106 adjacent to the airfoil 92 and a non-gas path side 108 adjacent to the root 88. Here, the non-gas path side 108 of the platform 90 generally below the second airfoil sidewall 104 is referred to as the underplatform 110.

Thermal-mechanical fatigue cracks may occur on the underplatform 110 and can be removed via machining. This machining, however, thins the platform 90, and applicant has determined that the frequency and amplitude of occurrence of such cracks resulting from use subsequent to such machining is related to the thickness of the platform 90. The thickness of the platform 90, in an exemplary embodiment may range from about 0.100-0.200 inches (2.5-5.1 mm), depending in part upon casting and/or previous repairs.

Figure 6:
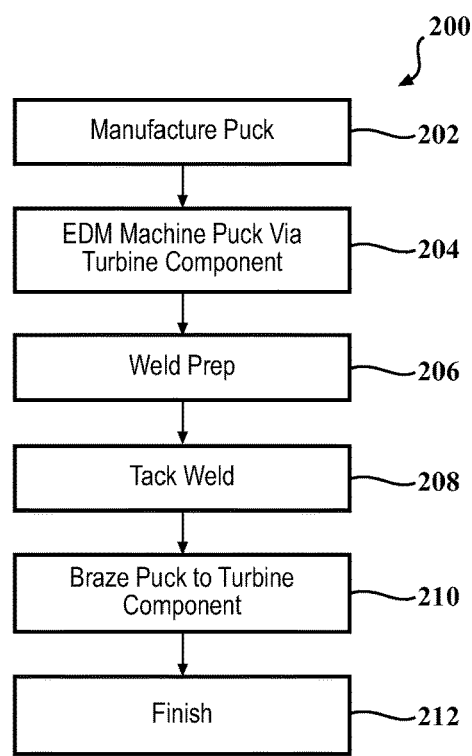
FIG. 6 is a flowchart illustrating a method to repair/remanufacture a platform of a turbine blade according to one disclosed non-limiting embodiment.
Figure 7:
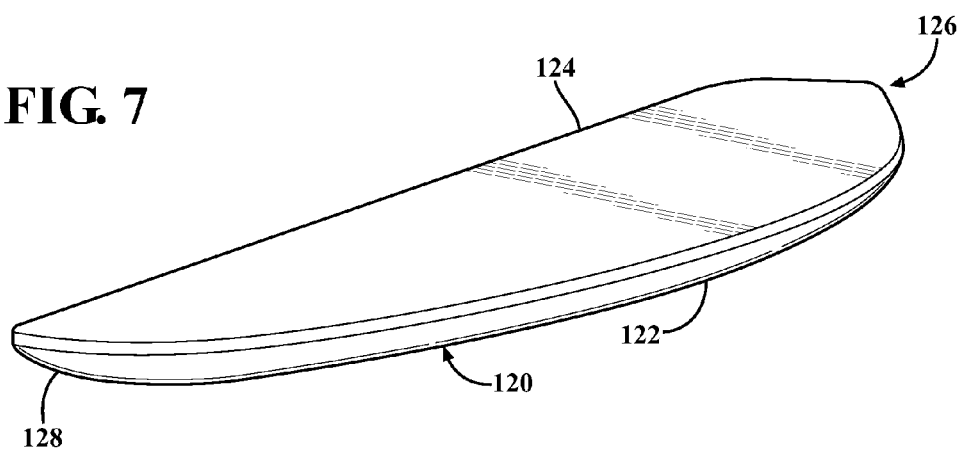
FIG. 7 is a perspective view of an example puck that is EDM to increase the thickness of the turbine blade platform.

With reference to FIG. 6, one disclosed non-limiting embodiment of a repair method 200 initially includes manufacture of a puck 120 (FIG. 7; step 202). The puck 120 may be machined, cast, or otherwise manufactured from, for example, a superalloy with grains that will be aligned with the engine axis A. Alternatively, the puck 120 may be manufactured from braze presintered preform (PSP). Such initial manufacture provides a puck 120 with dimensions that are close to the underplatform pocket formed by blade 84.

The puck 120, in this disclosed non-limiting embodiment, is generally semi-circular in shape with an arcuate side 122 that closely fits adjacent to the blade root 88 and a straight side 124 that generally aligns with an edge 90A (FIG. 5) of the platform 90. The puck 120 includes end sections 126, 128 that may be clipped or otherwise shaped for engagement within the underplatform 110 pocket of the non-gas path side 108 (FIG. 7). In this disclosed non-limiting embodiment, the puck 120 is has a thickness of about 0.030"-0.375" (0.762-9.525 mm).

Next, the puck 120 is subject to Electrical discharge machining (EDM) (step 204). Electrical discharge machining (EDM) is a highly accurate method of machining metal materials in which material is removed from the workpiece by a series of rapidly recurring current discharges between two electrodes separated by a dielectric liquid, and subject to an electric voltage. One electrode is referred to as the tool-electrode, or simply, the 'tool,' while the other is referred to as the workpiece-electrode, or 'workpiece.' Generally, the 'tool' serves as a working electrode to facilitate removal of material from the 'workpiece'. Here, the polarity is reversed from normal EDM operation such that the blade 84 is the working electrode and the puck 120 is the machined part. That is, the underplatform 110 of the blade 84 (the 'tool'), electro discharge machines the puck 120 (the 'workpiece').

The puck 120 is plunged into the underplatform 110 to remove material from the puck 120 until both parts create a near perfect fit one to another. Such a near perfect fit enhances braze strength, as it is desired for braze faying surfaces to have a gap no larger than about 0.005" (0.127 mm). That is, the puck 120 is initially cast and/or machined to be close to the dimension of the area of the underplatform 110, then subjected to the reverse EDM process to obtain a close-fitting gap therebetween. Trials have shown a finished gap of about 0.0005"-0.0045" (0.0127-0.1143 mm).

Next, the puck 120 and the underplatform 110 area are weld prepared (step 206). Weld preparation includes, but is not limited to, for example, degreasing, fluoride-ion cleaning, grit blast, hydrogen furnace clean, vacuum clean and/or others.

Next, the EDM machined platform puck 120 is then located in the blade underplatform 110 pocket and tack welded thereto (step 208). It should be appreciated that various methods may be alternatively or additionally provided to affix the puck 120 to the underplatform 110 so as to facilitate brazing (step 210).

A braze slurry is then applied around a perimeter of the puck 120 and subsequently brazed via the application of heat to the blade 84, puck 120, and braze slurry (step 210). The braze slurry flows over and around the puck 120 to join the puck 120 to the underplatform 110. Since brazing does not melt the base metal of the joint, brazing allows much tighter control over tolerances and produces a clean joint with minimal-if-any need for secondary finishing. Additionally, dissimilar metals and non-metals (i.e. metalized ceramics) can be brazed. That is, the puck 120 may be manufactured of a material dissimilar to that of the blade 84.

The braze slurry is readily received into the close finished gap interface between the platform puck 120 and the underplatform 110 via capillary action to provide an effective braze therebetween. That is, the reverse EDM interface provides a close-fitting interface that facilitates a high strength brazed interface and does not further reduce the thickness of the platform 90.

Figure 8:
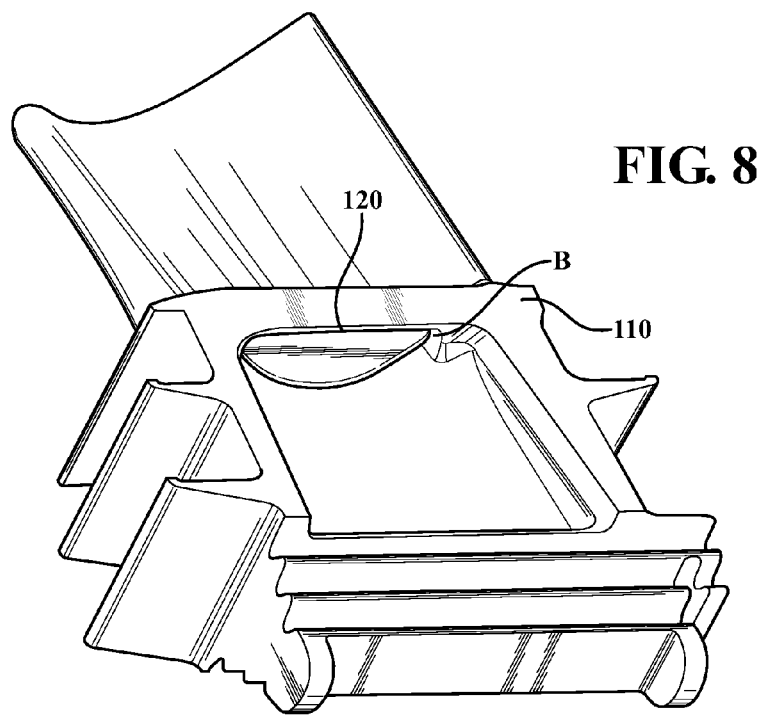
FIG. 8 is a perspective view of an underplatform region of the turbine blade with a puck according to one disclosed non-limiting embodiment.

Finally, the finished braze B may be blended and coated to form a desired profile (step 212; FIG. 8). The blend may be performed by hand and/or by machine operations.

Figure 9:
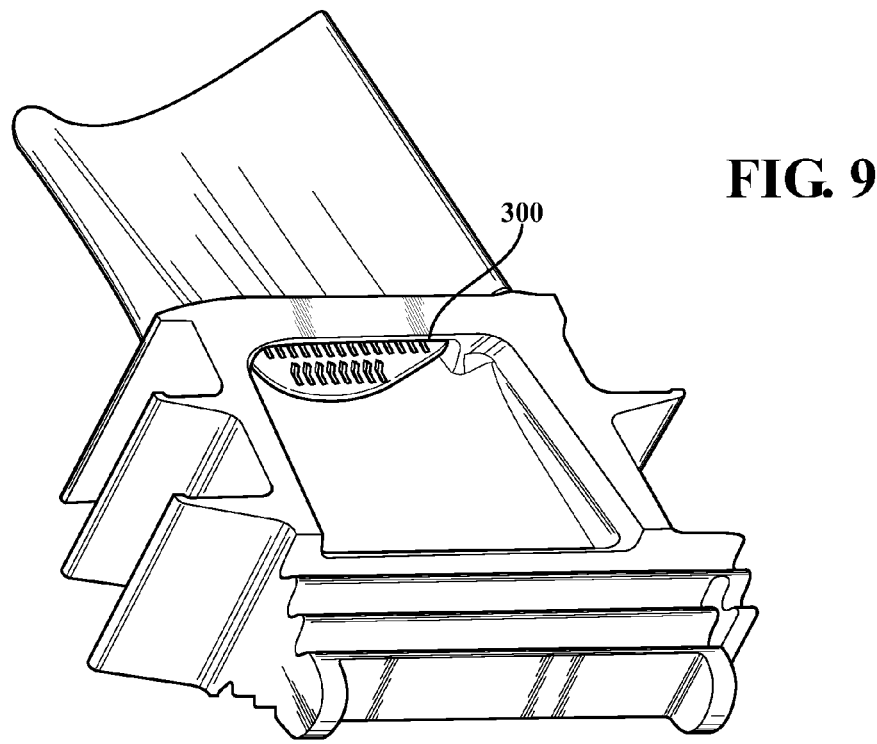
FIG. 9 is a perspective view of an underplatform region of the turbine blade with a puck according to another disclosed non-limiting embodiment.
Figure 10:
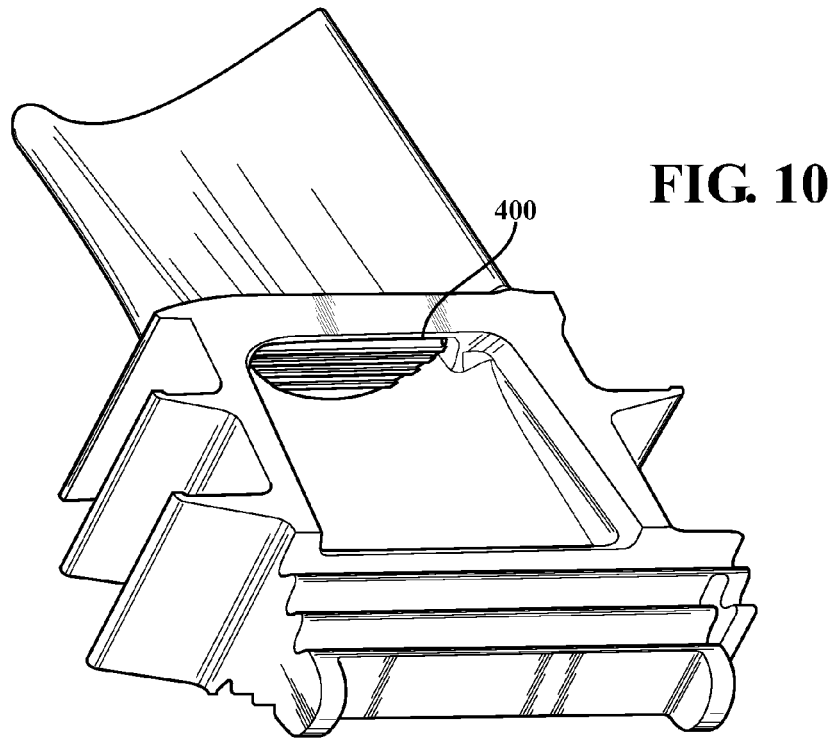
FIG. 10 is a perspective view of an underplatform region of the turbine blade with a puck according to another disclosed non-limiting embodiment.
Figure 11:
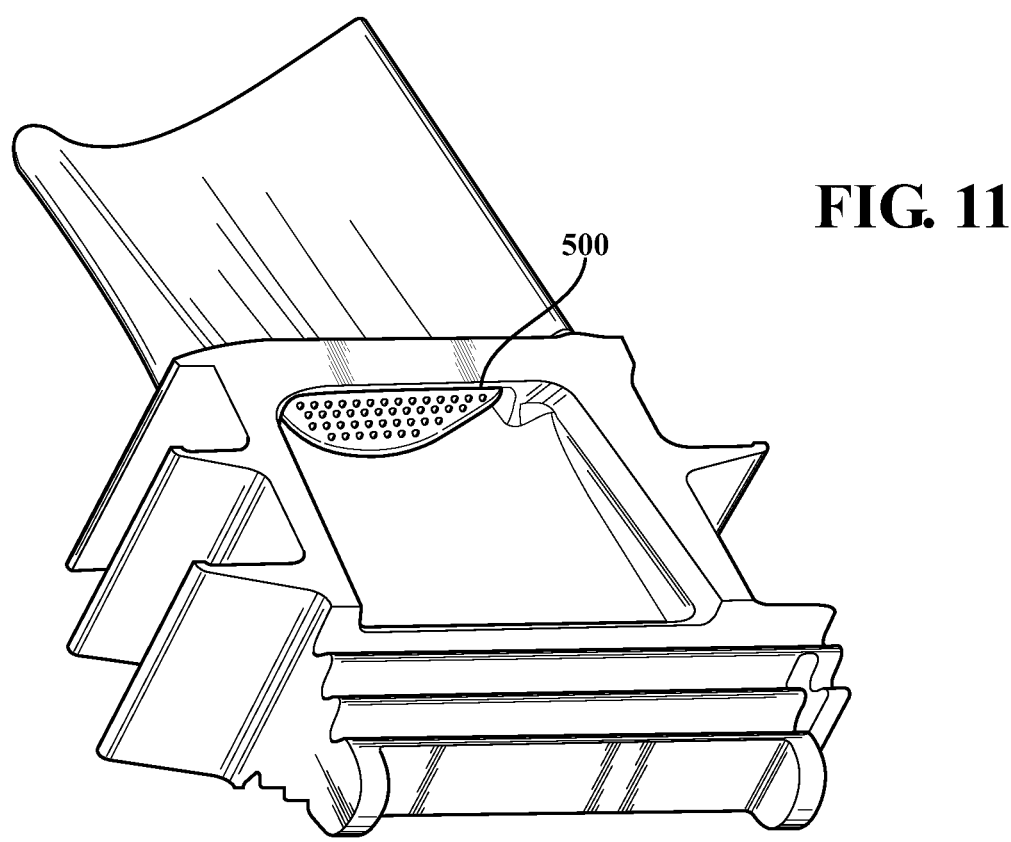
FIG. 11 is a perspective view of an underplatform region of the turbine blade with a puck according to another disclosed non-limiting embodiment.

With reference to FIG. 9, the platform puck 120 can replicate the OEM shape of the underplatform, or incorporate improved cooling and/or strengthening features such as chevron-shaped turbulators 300, a multiple of ribs 400 (FIG. 10), a multiple of dimples 500 (FIG. 11) or other such features. The features facilitate turbulation of a cooling airflow to further control the thermal effects on the turbine blade 84.

The method 200 provides a repair to a small portion of the component to increase platform thickness with the remainder being identical to an OEM component. The Reverse EDM machining also facilitates a relatively rapid repair.

The use of the terms "a," "an," "the," and similar are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method of remanufacturing a turbine component, comprising:
    placing a puck against a radially inward facing surface on an underplatform of a platform of the turbine component such that an entirety of the puck is underneath a radially outward facing surface of the platform;
    electrical discharge machining the puck via the turbine component to form an electrical discharged machined puck; and
    brazing the puck to the turbine component;
    wherein a total thickness of a finally remanufactured platform of the turbine component is greater than an initial thickness of the platform before remanufacturing.

2. The method as recited in claim 1, further comprising electrical discharge machining the puck via the underplatform of the turbine component.

3. The method as recited in claim 1, wherein electrical discharge machining the puck via the turbine component results in an interface gap between the electrical discharged machined puck and the turbine component of no larger than 0.005" (0.127 mm).

4. The method as recited in claim 1, further comprising manufacturing the puck from a braze presintered preform (PSP).

5. The method as recited in claim 1, further comprising tack welding the puck to the turbine component prior to the brazing.

6. The method as recited in claim 1, further comprising machining the radially inward facing surface of the underplatform before placing the puck against the turbine component.

7. The method of claim 1, wherein the puck does not penetrate through to a gas path surface of the platform.

8. The method of claim 1, wherein a full perimeter of the puck is surrounded by the underplatform.

9. The method of claim 1, wherein a radially inward side of the puck includes at least one of a turbulator, a rib, or dimples.

10. A method of remanufacturing a platform of a turbine blade, comprising:

positioning a puck against an underplatform of the platform, the platform having an initial thickness;

electrical discharge machining the puck via the underplatform of the platform to form an electrical discharged machined puck; and brazing the electrical discharged machined puck to the underplatform to increase a final thickness of the platform over the initial thickness of the platform, wherein the final thickness of the platform is of a finally remanufactured platform of the turbine blade and the initial thickness of the platform is before remanufacturing the platform.

11. The method as recited in claim 10, wherein electrical discharge machining the puck results in an interface gap between the electrical discharged machined puck and the underplatform of no larger than 0.005" (0.127 mm).

12. The method as recited in claim 10, further comprising manufacturing the puck from a braze presintered preform (PSP) prior to the electrical discharge machining.

13. The method as recited in claim 10, further comprising tack welding the electrical discharged machined puck to the underplatform prior to the brazing.

14. The method as recited in claim 10, further comprising machining the underplatform of the platform to a thickness less than the initial thickness before brazing the electrical discharge machined puck to the underplatform.

15. A method of remanufacturing a platform of a turbine blade, comprising:

machining an underside of the platform to remove a crack and form a machined surface area having a machined radial thickness less than an initial radial thickness of the platform;

electrode discharge machining a puck via the turbine blade to have a shape matching with the machined surface area of the underside of the platform;

locating the puck against the machined surface area to form an interface gap having a gap no larger than 0.005" (0.127 mm); and attaching the puck to the underside of the platform to increase the machined radial thickness of the platform at the machined surface area by a puck radial thickness;

wherein the machined radial thickness and the puck radial thickness together are greater than the initial radial thickness of the platform when remanufacturing of the platform is complete.

16. The method as recited in claim 15, wherein the underside of the platform is machined to remove a fatigue crack without penetrating through a gas path surface of the platform.

17. The method as recited in claim 15, wherein the puck is electrode discharge machined while in position against the machined surface area of the underside of the platform.

18. The method as recited in claim 17, wherein the puck is electrical discharge machined via the platform.

19. The method as recited in claim 18, wherein electrical discharge machining of the puck produces the gap.

20. The method as recited in claim 15, wherein the puck is attached to the underplatform via brazing so that an entirety of the puck is underneath the platform.

21. The method as recited in claim 20, further comprising blending the brazed puck to leave a total thickness of the machined radial thickness and the puck radial thickness greater than the initial radial thickness of the platform.

22. The method as recited in claim 20, further comprising coating the brazed puck.

23. The method as recited in claim 15, wherein the puck has a thickness of 0.030"-0.375" (0.762-9.525 mm).

* * * * *